United States Patent Office 3,029,175
Patented Apr. 10, 1962

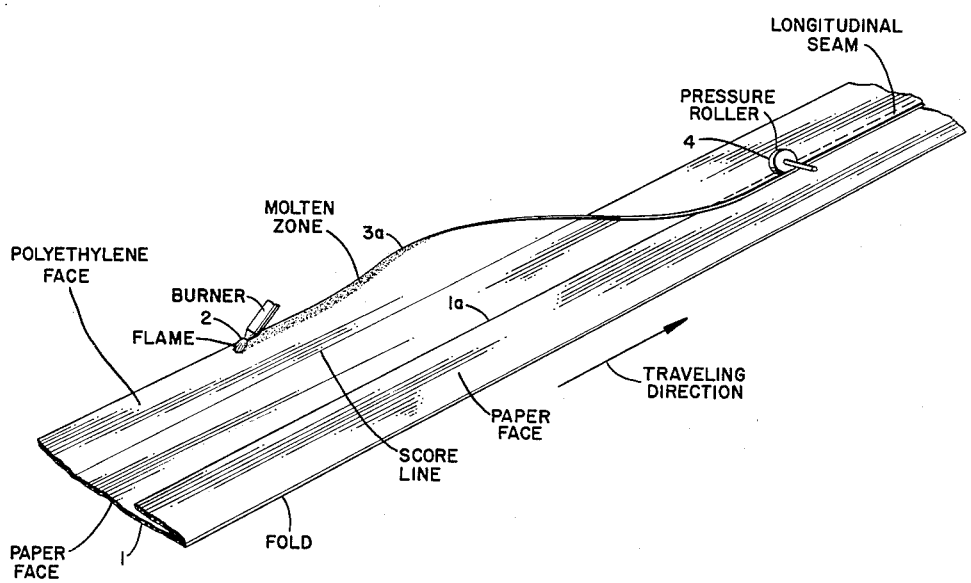

3,029,175
METHOD OF FORMING A BLANK OF CELLU-
LOSIC MATERIAL INTO A TUBULAR CARTON
Bo Erik Stenqvist, Lund, Sweden, assignor to Aktiebolaget
Åkerlund & Rausing, Lund, Sweden, a joint stock company of Sweden
Filed Dec. 20, 1957, Ser. No. 704,015
Claims priority, application Sweden Jan. 4, 1957
1 Claim. (Cl. 156—82)

The present invention relates to a method of heat and pressure sealing a hydrophobic polyethylene coating layer to a cellulosic material such as, for example, cardboard which is hydrophilic.

For instance the manufacture of tubular cartons from plane carton blanks comprising a cardboard body having a continuous hydrophobic polyethylene lining on one side thereof has turned out to present difficulties in producing a satisfactory overlapping joint between the two carton blank margins extending axially of the carton tube through conventional heat and pressure sealing. The reason is that the adhesion between the coating layer of one margin and the cardboard body portion of the other margin will be of an extremely imperfect nature since it will be conditional substantially on the pure mechanical binding between the plastic layer and the cardboard material texture.

The present invention aims at the provision of a method effecting an adhesion of mechanical as well as physical nature between a polyethylene layer of originally hydrophobic character and a cellulosic material. Said method substantially implies that the sealing face of the sealing zone of the polyethylene layer first is swept by an oxidizing flame thereby to be heated above the melting point of the polyethylene layer, in its melted state then is brought together with the sealing face of the sealing zone of the cellulosic material, and finally an adequate sealing pressure is applied to the two sealing zones substantially until the melted polyethylene of the joint has solidified.

By the method according to the invention there is gained a mechanical adhesion between the polyethylene layer and the cellulosic material that is of a quality by no means less than that of the mechanical adhesion in similar joints produced in the conventional way. However, above that there is added a physical adhesion substantially improving the properties of the joint. Said physical adhesion is conditional on the fact the oxidizing flame effects an oxidation of the corresponding surface layer of the polyethylene layer thereby causing it to change its hydrophobic state into a hydrophilic one and thus adapting it for physical adhesion to a material of hydrophilic nature.

Though the invention per se is of general application in all those connections where a coating layer of hydrophobic nature is to be sealed to a cellulosic material below there will be disclosed a specific embodiment thereof to illustrate the principles of the invention.

In such example it is assumed that tubular cartons comprising a cardboard body having a continuous coating or lining of polyethylene of hydrophobic nature on one side thereof are to be produced from plane carton blanks. The polyethylene coating or lining is to form the inside of the final carton.

The improved method of heat and pressure sealing an initially hydrophobic polyethylene coating layer to a cellulosic material is illustrated in the accompanying drawing.

With reference now to the drawing, the plane cardboard blanks 1 are fed in the direction corresponding to the carton tube axis as indicated by the arrow along a conveyor thereby to pass through a heating station where one or more oxidizing flames 2 from a burner are caused to sweep a relatively narrow longitudinal margin zone 3a of the polyethylene layer 3 which is applied to one face of the cardboard blank 1. The flames are arranged to heat the polyethylene layer of said margin zone 3a above the melting point and through oxidation simultaneously to change the hydrophobic state thereof into a hydrophilic one.

After the marginal zone 3a of the polyethylene layer has been heated to molten state, it is folded over in such a way that it will overlap and engage, while molten, the corresponding other longitudinal margin zone 1a of the opposite face of the carton blank which is of course a cardboard surface.

Through an adequate pressure that may be applied by means of pressure rolls 4 positioned along the conveyor, the two margin zones 1a and 3a are pressed together for a period of time sufficient to allow for solidification of the melted polyethylene and thus for stabilization of the overlapping joint of sealing as such.

Preferably, the carton blanks are continuously fed along the conveyor during all steps of the sealing operation.

Besides producing a surface oxidation of the sealing zone polyethylene layer serving as an adhesive the oxidizing flames also effect a very rapid heating thereof which is confined substantially to the surface of the layer in question. Thus, they will ensure a heating of the surface portion of the polyethylene layer sufficient to render an otherwise simultaneous heating of the other sealing zone superfluous.

In fact, by means of open flames there may be supplied considerably larger heat quantities per unit of time to the surface of the polyethylene surface than by heating means supplying the heat e.g. through conduction.

Thus, the two sealing zones to be brought together into a joint may be kept separated during the heating operation and only thereafter be put together, a mode of operation to which as a rule it is not possible to resort when using conduction heating means.

Another advantage of open flames as heating means is that through varying the spacing of the burner nozzles from the surface to be heated or the angle of incidence of the flames thereto they may be caused to heat narrower or wider sealing zones whereby one and the same heating means may be used for sealing zones of varying widths.

I claim:

In the method of forming a blank of cellulosic material into a tubular carton, said blank having an initially hydrophobic polyethylene coating layer applied to one face thereof, the steps which comprise sweeping a longitudinal marginal zone of said polyethylene layer by an oxidizing flame whereby to heat at least the surface portion thereof above its melting point and simultaneously change the state of said polyethylene from hydrophobic to hydrophilic, bringing said marginal zone while in said molten state into overlapping engagement with a corresponding longitudinal marginal zone at the opposite cellulosic face of said blank and applying pressure to said overlapped marginal zones substantially until the molten polyethylene has solidified.

References Cited in the file of this patent

UNITED STATES PATENTS

| | | |
|---|---|---|
| 2,210,436 | Wiengand et al. | Aug. 6, 1940 |
| 2,419,304 | Warth et al. | Apr. 22, 1947 |
| 2,679,887 | Doyle et al. | June 1, 1954 |
| 2,714,571 | Irion | Aug. 2, 1955 |
| 2,715,075 | Wolinski | Aug. 9, 1955 |
| 2,715,076 | Wolinski | Aug. 9, 1955 |
| 2,715,077 | Wolinski | Aug. 9, 1955 |
| 2,715,088 | Gunning | Aug. 9, 1955 |
| 2,767,103 | Loukomsky | Oct. 16, 1956 |
| 2,795,820 | Grow et al. | June 18, 1957 |
| 2,801,446 | Wolinski | Aug. 6, 1957 |
| 2,897,109 | Voightman | July 28, 1959 |
| 2,934,130 | Lane et al. | Apr. 26, 1960 |